No. 696,448. Patented Apr. 1, 1902.
I. W. KEITHLEY.
GEAR FOR BICYCLES.
(Application filed Apr. 8, 1898.)

(No Model.)

Witnesses.
W. J. Baldwin
E. M. Healy.

Inventor.
I. W. Keithley.

Southgate & Southgate
Attorneys.

UNITED STATES PATENT OFFICE.

IRVING W. KEITHLEY, OF WORCESTER, MASSACHUSETTS.

GEAR FOR BICYCLES.

SPECIFICATION forming part of Letters Patent No. 696,448, dated April 1, 1902.

Application filed April 8, 1898. Serial No. 676,893. (No model.)

*To all whom it may concern:*

Be it known that I, IRVING W. KEITHLEY, a citizen of the United States, residing at Worcester, in the county of Worcester and State of Massachusetts, have invented a new and useful Gear for Bicycles, of which the following is a specification.

My invention relates to that class of bicycles in which power is transmitted from the crank-shaft to the rear wheel of the machine by a train of spur-toothed gearing.

The especial object of my invention is to provide an improved construction for journaling or supporting the rim-gear which forms the intermediate wheel of the driving-train which will permit of the machine being operated with comparatively little friction or which can be readily adjusted or tightened to provide for wear.

To these ends my invention consists of the parts and combinations of parts, as hereinafter described, and more particularly pointed out in the claims at the end of this specification.

Figure 1:
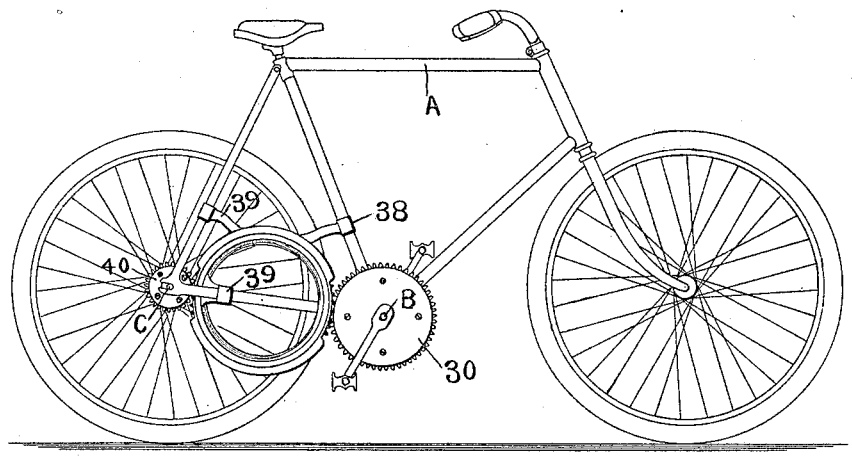
Figure 2:
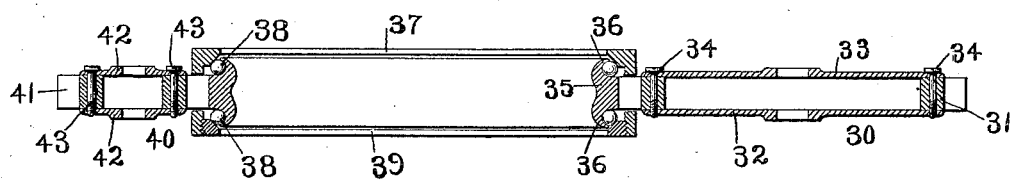

In the accompanying drawings, Figure 1 is a side view of a bicycle provided with a driving-train constructed according to my invention, and Fig. 2 is a sectional plan view illustrating the form of gearing which I preferably employ.

A driving mechanism for bicycles constructed according to my invention comprises a spur-toothed gear secured upon the crank-shaft of the machine, a spur-toothed gear fastened upon the rear wheel, and an intermediate rim-gear journaled inside of a supporting-ring. The crank-shaft gear and the rear-wheel gear each preferably comprises an annular section or ring of vulcanite fiber or similar material having the teeth cut or formed therein and metallic side pieces which are clamped together to form the body of the gears. The intermediate rim-gear is preferably made entirely of metal and is provided at both sides of its working face with an extending ball-flange for receiving the bearing-balls which journal said intermediate rim-gear in the supporting-ring. The intermediate rim-gear and its bearing-balls are preferably secured in place in their supporting-ring by a retaining ball-ring, which is threaded into the supporting-ring, so that it can be tightened or adjusted to take up the wear.

Referring to the drawings and in detail, A designates the framework of a bicycle, B the crank-shaft thereof, and C the stationary axle of the rear wheel. These parts may be of the ordinary or preferred construction and need not be herein described at length. Secured on the crank-shaft B is a driving-gear 30.

As illustrated most clearly in Fig. 2, the driving-gear 30 comprises an annular ring or section of hard rubber or similar material 31, having the gear-teeth formed therein, said hard-rubber section being secured in place between side plates 32 and 33, which are clamped together by screws 34 and form the central part of the driving-gear 30. Meshing with and driven from the driving-gear 30 is an intermediate rim-gear 35.

In the construction illustrated in Fig. 2 the rim-gear 35 is provided at each side of its working face or toothed section with ball-receiving flanges 36.

The supporting-ring 37 may be secured to the frame of the machine in any desired or preferred manner—as, for example, by the braces or clamps 39.

The intermediate rim-gear 35 is journaled in its supporting-ring 37 by means of two sets of bearing-balls 38, and the intermediate rim-gear and its bearing-balls are adjustably secured in place by means of a retaining-rim 39, which is threaded into the supporting-ring 37, so that it can be adjusted or screwed up to take up the wear.

The driven gear 40, which meshes with and is driven from the intermediate rim-gear 35, may be secured to the hub or rear wheel and journaled on the stationary axle C in any of the ordinary or preferred manners.

As illustrated, the driven gear 40 is of a similar construction to the driving-gear 30—that is to say, it comprises a central toothed section 41, of hard rubber or similar material, which is clamped between side plates 42 by means of screws 43.

By means of this construction it will be seen that I have provided a strong, compact, and efficient driving-train for bicycles, and as the bearings of the intermediate rim-gear are located so as to be comparatively well protected from dust the driving-train need not necessarily be inclosed within a casing, although it is obvious that it may be so inclosed, if desired.

By forming the toothed section of the driving and driven gear of vulcanite fiber or similar material and employing a metallic intermediate gear I am enabled to dispense with the crunching or grinding incident to constructions in which the metallic teeth are directly meshed together, and I have provided a form of gearing which will work with comparatively little friction.

I am aware that changes may be made in the construction of my driving-train for bicycles without departing from the scope of my invention as expressed in the claims, and I do not wish, therefore, to be limited to the features of construction herein specifically illustrated.

In this application I do not desire to claim, broadly, the combination of a crank-shaft gear and rear-wheel gear and an intermediate rim-gear journaled inside of a supporting-ring, as I wish to claim the same in my companion application, filed October 18, 1897, Serial No. 655,584.

Having thus fully described my invention, what I do claim, and desire to secure by Letters Patent of the United States, is—

1. In a bicycle, the combination of a crank-shaft, a rear wheel, a train of gearing for transmitting power from the crank-shaft to the rear wheel, comprising a crank-shaft gear, a rear-wheel gear, and an intermediate open-centered rim-gear having ball-receiving flanges upon opposite sides of its working face, a supporting-ring forming an external bearing or box within which the rim-gear is mounted, two sets of bearing-balls for journaling the rim-gear in the supporting-ring, and a retaining-ring secured in place so that it can be adjusted to take up wear on both sets of bearing-balls, substantially as described.

2. In a bicycle, the combination of a crank-shaft, a rear wheel, a train of gearing for transmitting power from the crank-shaft to the rear wheel, comprising a crank-shaft gear 30, a rear wheel-gear 40, an intermediate open-centered rim-gear 35 having ball-receiving flanges 36 upon opposite sides of its working face, a supporting-ring 37 forming an external bearing or box within which the rim-gear 35 is supported, two sets of bearing-balls 38, and a retaining-ring 39 having external screw-threads fitting into a threaded socket in the supporting-ring so that the same may be adjusted to take up wear on both sets of bearing-balls, substantially as described.

In testimony whereof I have hereunto set my hand in the presence of two subscribing witnesses.

IRVING W. KEITHLEY.

Witnesses:
PHILIP W. SOUTHGATE,
LOUIS W. SOUTHGATE.